United States Patent [19]
Kline

[11] 3,780,993
[45] Dec. 25, 1973

[54] AGITATING EXTENSIONS FOR THE CENTRAL MIXING AUGER OF A GRINDER-MIXER

[75] Inventor: Charles M. Kline, Reinholds, Pa.

[73] Assignee: Sperry Rand Corporation, New Holland, Pa.

[22] Filed: May 31, 1972

[21] Appl. No.: 258,174

[52] U.S. Cl. .......................... 259/97, 259/DIG. 31
[51] Int. Cl. ................................................ B01f 5/12
[58] Field of Search ..................... 259/97, 8, 23, 24, 259/43, 44, 95, DIG. 31

[56] References Cited
UNITED STATES PATENTS

| | | | |
|---|---|---|---|
| 1,576,018 | 3/1926 | Wolf | 259/97 |
| 1,721,553 | 7/1929 | Haines | 259/97 |
| 2,101,490 | 12/1937 | Bullock | 259/97 |
| 2,864,593 | 12/1958 | Shoup | 259/97 |
| 3,133,727 | 5/1964 | Luscombe | 259/97 |
| 3,285,581 | 11/1966 | Moore | 259/23 |
| 3,589,684 | 6/1971 | Dixon | 259/97 |

*Primary Examiner*—Robert W. Jenkins
*Attorney*—Frank A. Seimar, Joseph A. Brown, John R. Flanagan and James J. Kennedy

[57] ABSTRACT

The present invention relates to the provision of a plurality of agitating extensions to the lower auger flighting of the central mixing auger of a grinder-mixer of the type having a tank supported on a mobile frame. The agitating extensions are fixed directly to the lower flighting and project outwardly therefrom with the outer ends thereof terminate in close proximity to the side walls of the tank, thereby tending to engage and agitate material being contained within the lower portion of the mixing tank.

6 Claims, 4 Drawing Figures ance with the present invention.
AGITATING EXTENSIONS FOR THE CENTRAL MIXING AUGER OF A GRINDER-MIXER

BACKGROUND OF THE INVENTION

The present invention relates to an agricultural grinder-mixer, and more particularly to the internal mechanism employed therein for continually mixing the material contained therein.

Most grinder-mixers of today employ what is termed a central upright mixing auger which generally functions to continually convey material from the bottom of the mixing tank to an upper portion thereof where the material is thrown outwardly and allowed to gravitate back down into the lower portion of the mixing tank. Also, most mixing tanks employed by grinder-mixers have an inverted conical shaped lower portion, i.e., the walls of the lower portion extend generally downwardly and inwardly. The conical shape of the lower tank portion tends to induce the material contained therein to move inwardly towards the central mixing auger such that the material can be repeatedly mixed with other material contained within the mixing tank. One quite common problem associated with the conical shape of the lower tank portion is that the material moving downwardly in the tank tends to cluster and bridge between the lower walls of the tank, thereby prohibiting the free downward flow of material to the base of the mixing tank where it may be received by the central mixing auger for repeated mixing.

One particular approach to the problem of the clustering and bridging of material in the lower tank portion has utilized a central mixing auger in which the lower flighting thereof is provided with a relatively wide outside diameter such that in operating the auger the lower flighting tends to raise and agitate the material contained in the lower portion of the tank, thereby tending to break-up the clusters of material disposed about the lower side walls of the mixing tank. Although functionally such wide base augers have been successful, they are nevertheless quite expensive and require substantially greater power than other grinder-mixers of similar capacity.

SUMMARY OF THE INVENTION

Applicant has devised a central mixing auger for a grinder-mixer that has the functional advantages of the wide base auger while being relatively inexpensive and requiring significantly less power. In particular, applicant's invention comprises a central mixing auger that is provided with a plurality of outwardly projecting extensions about the lower flighting thereof, the outward extensions having outer ends terminating in close proximity to the side walls of the lower portion of the mixing tank. As the central mixing auger is rotated, the outwardly projecting extensions engage and agitate surrounding material in such a manner that the clusters that may be formed about the lower portion of the tank are broken and the material contained within the mixing tank can gravitate freely into the base of the tank and consequently be remixed with other material.

It is therefore the principle object of the present invention to provide a central mixing auger for a grinder-mixer that tends to agitate and break up accumulations of material that have massed and clustered in the lower portion of the grinder-mixer's mixing tank.

A further object of the present invention is to provide a grinder-mixer with a central mixing auger having agitating means associated therewith that is relatively inexpensive and requires a minimum amount of power.

A more particular object of the present invention resides in the provision of a central mixing auger for a grinder-mixer that includes a series of axially and circumferentially spaced extensions projecting outwardly from the lower auger flighting thereof so as to extend towards and terminate in close proximity to the outer walls of the grinder-mixer's mixing tank, whereby the rotation of said central mixing auger results in the extensions engaging and agitating the material contained in the lower portion of the tank.

Other objects and advantages of the present invention will become apparent and obvious from a study of the following description and the accompanying drawings which are merely illustrative of the present invention.

DESCRIPTION OF THE PREFERRED EMBODIMENT

Figure 1:
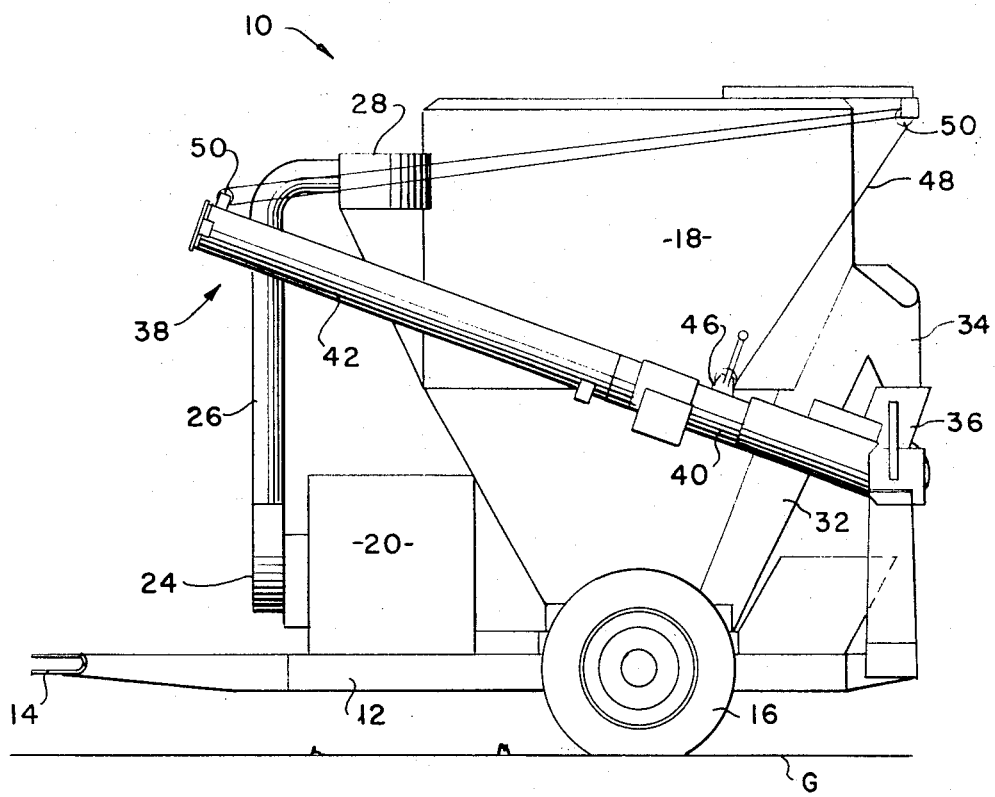
FIG. 1 is a side elevational view of a portable grinder-mixer drawn in accordance with the present invention.
Figure 2:
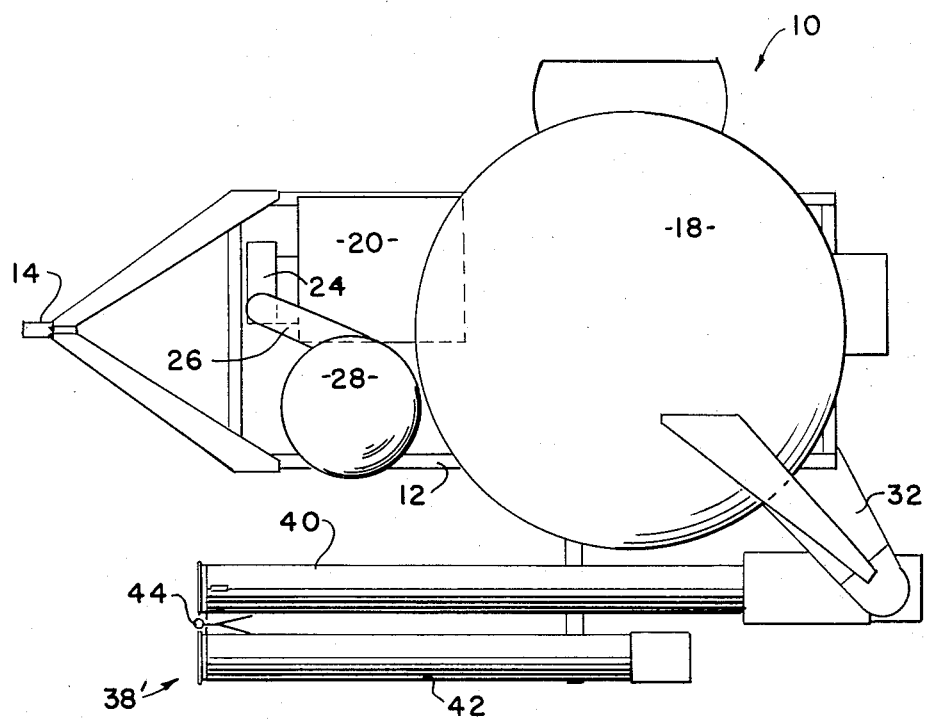
FIG. 2 is a plan view of the grinder-mixer shown in FIG. 1.

With reference to the drawings, particularly FIGS. 1 and 2, a grinder-mixer is shown therein and indicated generally by the numeral 10. The grinder-mixer 10 comprises a generally fore-and-aft extending main frame 12 having a clevis 14 formed about the front thereof and adapted to be connected to draw bar of a tractor, not shown, such that the grinder-mixer may be towed from place to place in accordance with the desires of the operator. The main frame 12 is further provided with a pair of wheels 16 (only one of which is shown), the wheels as shown in FIG. 1 engaging the ground G. Mounted on the main frame 12 is a mixing tank 18, the mixing tank 18 having an upper cylindrical portion and a lower conical portion, the conical portion having downwardly and inwardly extending side walls that terminate near the main frame to form the base or bottom of the tank 18.

Disposed forwardly of the tank 18 is a hammer mill 20 also secured to the main frame 12, the hammer mill not being shown in detail but being of any conventional type which functions to initially grind feed material before entering the mixing tank 18. After the feed material has been ground in the hammer mill 20, a substantial portion is allowed to gravitate into a transfer auger 22 (shown particularly in FIGS. 3 and 4) which conveys the ground feed material from the hammer mill 20 into the base portion of the mixing tank 18. The ground material that does not gravitate into the transverse auger 22 is caused to be airborne by fan 24 and conveyed upwardly through duct 26 into cyclone 28 which functions in a conventional manner to separate the feed material from the air. The feed material separated by the cyclone 28 is allowed to gravitate downwardly into the transfer auger 22 by means not shown and not considered material to the present invention.

Figure 3:
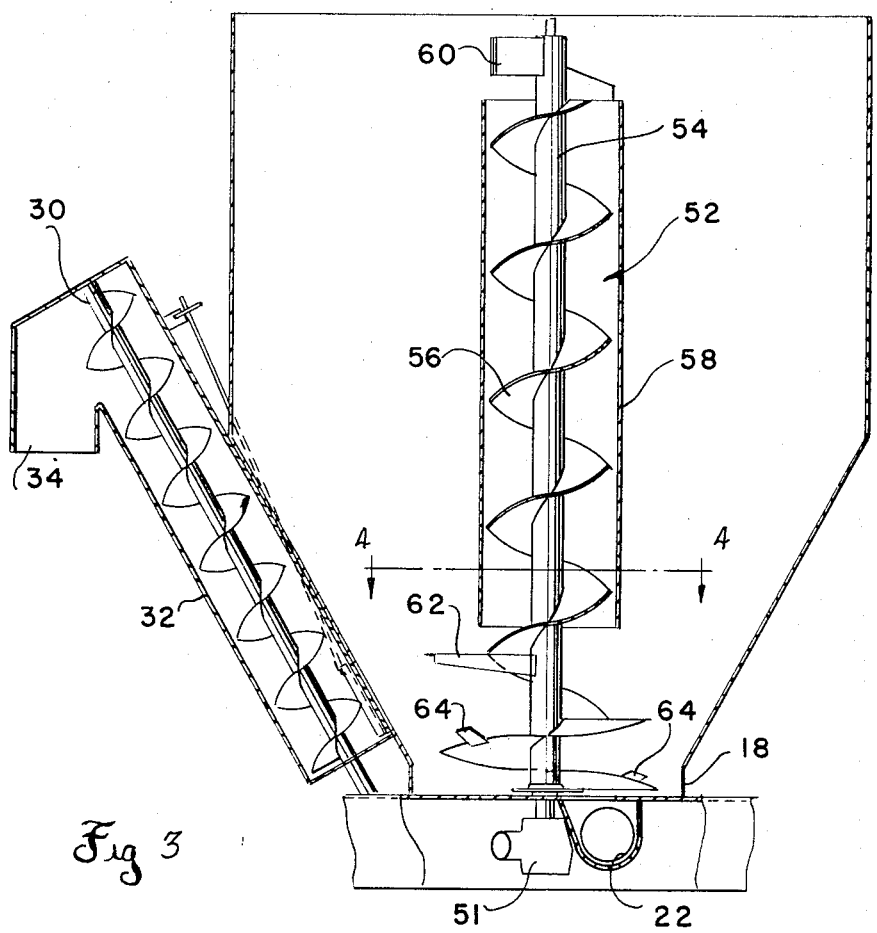
FIG. 3 is a fragmentary sectional view of the grinder-mixer's mixing tank, showing particularly the central mixing auger of the present invention having its outwardly projecting extensions about the lower flighting thereof.

The mixing tank 18 is provided with a discharge auger 30 that is rotatively maintained within an upright extending tube 32, as best seen in FIG. 3. Thus, during unloading feed material contained within the mixing tank 18 is conveyed outwardly therefrom by the auger 30 which elevates the material into the spout 34 which discharges the material into chute 36 (FIG. 1). Chute 36 is operative to feed material into a side unloading auger assembly, indicated generally by the numeral 38, which comprises a first primary unloading auger assembly 40 connected by hinge means 44 to a second extension auger 42. Although not particularly shown the unloading auger assembly 38 is pivotally mounted about both a vertical and transverse axis such that the auger assembly may pivot sideways as well as up and down. To provide control during the pivotal movement of the unloading auger assembly 38, a wench 46 is provided thereon and is particularly adapted to control the unloading auger assembly by a cable 48 that is trained around a pair of pulleys 50, as best shown in FIG. 1. The unloading auger assembly 38 does not form a material part of the present invention and can best be appreciated from a study of U. S. Pat. No. 3,638,816 to William W. Mann.

Figure 4:
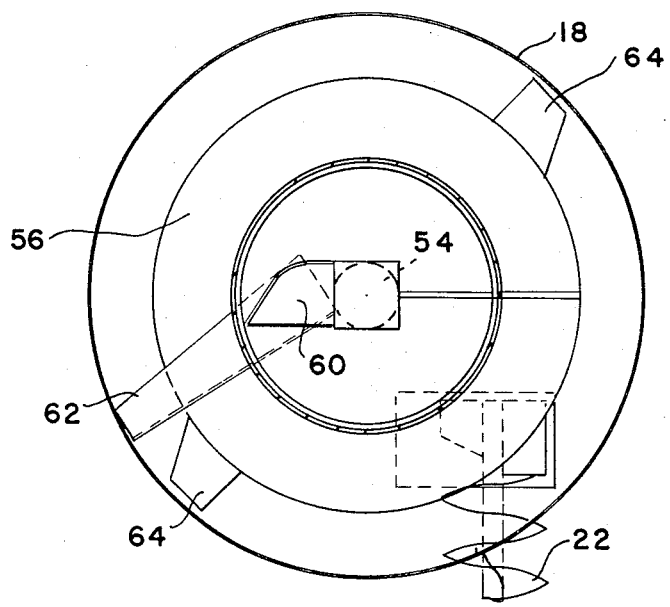
FIG. 4 is a sectional view taken along the line 4—4 of FIG. 3.

Turning particularly to FIGS. 3 and 4 and the central mixing auger of the present invention, it will be noted that the central mixing auger is shown therein and indicated generally by the numeral 52. Generally, the central mixing auger 52 extends from the lower or base portion of the mixing tank to the upper portion thereof and, in terms of function, acts to continually convey material from the bottom portion of the tank to the upper portion where the material conveyed thereto is thrown therefrom and gravitates back downwardly into the lower portions of the tank 18.

Viewing the central mixing auger 52 in detail, it will be seen that the auger comprises a main upright generally centrally disposed main auger tube 54 that is rotatively driven by a gearbox 51, the main auger tube being rotatively mounted by any suitable journalling means within the tank 18 and having an upper portion extending through a stationary cylindrical casing 58. The cylindrical housing 58 is fixed to the tank 18 and held stationary relative to the mixing auger 52 by any suitable means which may include an upper strap connection and a series of radial connecting rods. The main auger tube 54 includes an auger flighting 56 wound continuously from the lower portion thereof to the upper portions. It will be observed from FIG. 3 that in the particular embodiment shown the lower flighting 56 is of a larger outside diameter than the auger flighting disposed about the upper portion of the main auger tube 54. Also, it will be seen that the auger tube 54 includes a lower arm 62 that extends radially therefrom and upper thrower 60 which also extends radially from the main auger tube and principally functions to fling the material conveyed to the top of the auger away therefrom such that it may gravitate into the lower portions of the tank 18.

As seen in FIG. 3, the outside diameter of the flighting disposed about the lower portion of the tank 18 terminates in spaced apart relationship relative to the side walls of the conical portion of the tank. As previously pointed out in the "Background of the Invention," it is not uncommon for material gravitating downwardly into the tank to accumulate and form clusters along the conical shaped walls of the lower portion of the tank. To break up these clusters and to keep the material in the bottom portion of the tank from forming into accumulations, the lower flighting is provided with a pair of axially spaced and circumferentially spaced extensions 64 which project outwardly from the lower flighting, with the outer ends thereof terminating in close proximity to the adjacent outer walls of the lower conical portion of the tank. In particular, from FIG. 4 it is observed that the extensions 64 are circumferentially spaced approximately 180° apart.

Therefore, in operation as the central mixing auger 54 is driven such that material in the lower portion of the tank is conveyed upwardly and discharged from the top of the auger, the outwardly projecting extensions 64 continually engage and agitate the material contained in the lower portion of the tank. This agitation tends to lift the material and consequently break up the formation of clusters and the like which were common with grinder-mixers of prior art. It should be particularly pointed out that the present arrangement of using the outwardly projecting extensions gives the functional advantage that may be realized in much more expensive wide auger base designs and besides provides a design that can be operated with substantially less power than such wide base auger designs. Therefore, it is obvious that the present invention presents a simple, reliable and relatively inexpensive central mixing auger design that while continually mixing the material in the tank also serves the function of agitating the material in the lower part of the tank and thereby preventing accumulations and clusters, and consequently allowing the material to freely gravitate to the lower portion of the tank where that material may be readily mixed with other material therein.

The terms, "upper" "lower," "forward," "rearward" etc., have been used herein merely for the convenience of the foregoing specification and in the appended claims to describe the agitating extensions for the central mixing auger of a grinder-mixer and its parts as oriented in the drawings. It is to be understood, however, that these terms are in no way limiting to the invention since the agitating extensions for the central mixing auger of a grinder-mixer may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described my invention, what I claim is:

1. In a mixer of the type including a frame, a mixing tank supported by said frame, and means for feeding material to and from said mixing tank, the improvement comprising: a generally centrally disposed mixing auger rotatively mounted about a generally vertical axis within said mixing tank and comprising, an auger tube; flighting wound around said auger tube from a bottom portion to a top portion thereof, said flighting being adapted to convey material upwardly from the bottom portion of said mixing tanks; and at least one extension element fixed to and spaced about the lower portion of said auger flighting and projecting outwardly and upwardly therefrom to engage and lift the surrounding materials.

2. A mixer, as recited in claim 1, wherein said extension element comprises a main body portion which extends outwardly and upwardly from said auger flighting.

3. A mixer, as recited in claim 2, wherein said main body portion extends at an incline from said auger flights.

4. In a portable grinder-mixer of the type having a wheel supported frame, a mixing tank disposed on said frame and having a lower conical shape portion with walls extending generally downwardly and inwardly, means for feeding material to and from said mixing tank, the improvement comprising an upright generally centrally disposed auger rotatively mounted within said mixing tank and comprising, an upright auger tube rotatively mounted within said mixing tanks; auger flighting wound around upper and lower portions of said auger tube and particularly adapted to convey material upwardly within said mixing tank, said lower auger flighting having an outside diameter spaced inwardly from the walls of the lower portion of said tank; and one or more extensions fixed to the lower auger flighting and projecting outwardly and upwardly therefrom, whereby material contained in the lower portion of the tank is engaged lifted and agitated by said extensions.

5. A grinder-mixer, as recited in claim 4, wherein said one or more extensions includes two extensions phased approximately 180° apart.

6. A grinder-mixer, as recited in claim 4, wherein said lower auger flighting has an outside diameter greater than the upper auger flighting, and wherein said one or more extensions include two extensions fixed to portions of the lower auger flighting and projecting outwardly and upwardly therefrom in axial circumferentially spaced apart relationship.

* * * * *